United States Patent
Sato

(10) Patent No.: US 7,824,334 B2
(45) Date of Patent: Nov. 2, 2010

(54) ULTRASONOGRAPH AND METHOD AND PROGRAM FOR GENERATING ULTRASONOTOMOGRAPHIC IMAGE

(75) Inventor: Yoshiaki Sato, Kanagawa (JP)

(73) Assignee: FUJIFILM Corporation (JP)

( * ) Notice: Subject to any disclaimer, the term of this patent is extended or adjusted under 35 U.S.C. 154(b) by 1350 days.

(21) Appl. No.: 11/312,466

(22) Filed: Dec. 21, 2005

(65) Prior Publication Data

US 2006/0140465 A1 Jun. 29, 2006

(30) Foreign Application Priority Data

Dec. 24, 2004 (JP) ............................. 2004-373947
Jun. 7, 2005 (JP) ............................. 2005-167145

(51) Int. Cl.
*A61B 8/00* (2006.01)
(52) U.S. Cl. ...................... 600/437; 600/407
(58) Field of Classification Search .............. 600/437, 600/407
See application file for complete search history.

(56) References Cited

U.S. PATENT DOCUMENTS

| 5,644,662 A * | 7/1997 | Vuylsteke .................... 382/302 |
| 5,708,693 A | 1/1998 | Aach et al. |
| 2002/0006230 A1 * | 1/2002 | Enomoto .................... 382/261 |
| 2002/0094115 A1 * | 7/2002 | Ogawa ........................ 382/128 |
| 2002/0169377 A1 * | 11/2002 | Khairkhahan et al. ....... 600/433 |
| 2004/0073112 A1 | 4/2004 | Azuma et al. |

OTHER PUBLICATIONS

Hiroya Ozawa, "Staging of Esophagus Cancer With Fine Probe Ultrasonic Endoscope", Digestive Endoscope, vol. 14, No. 5, 2002, pp. 583-588.

\* cited by examiner

*Primary Examiner*—Long V Le
*Assistant Examiner*—Joel F Brutus
(74) *Attorney, Agent, or Firm*—Sughrue Mion, PLLC

(57) ABSTRACT

An ultrasonograph is provided with a frequency component adjuster that adjusts spatial frequency components of original image data $RAW_0$ of an ultrasonotomographic image. The frequency component adjuster is constituted of an unsharp image data generator, a subtraction circuit, a weighting circuit, an integration circuit, a multiplication circuit and an addition circuit. The unsharp image data generator circuit generates unsharp image data $RAW_i$ (i=1 to 5) by reducing the spatial frequency components of the original image data $RAW_0$ in five steps. The subtraction circuit generates differential image data $\Delta RAW_j$ (j=1 to 4) by subtracting the unsharp image data $RAW_i$ from $RAW_{i-1}$. The weighting circuit weights the differential image data $\Delta RAW_j$ by multiplying them by respective coefficients $k_j$ ($-1 < k_j < 1$). The integration circuit integrates the differential image data $\Delta RAW_j$ to generate adjusted image data RAW_En. The addition circuit adds the adjusted image data RAW_En to the original image data $RAW_0$ to generate output image data RAW_out.

62 Claims, 10 Drawing Sheets

ULTRASONOGRAPH AND METHOD AND PROGRAM FOR GENERATING ULTRASONOTOMOGRAPHIC IMAGE

FIELD OF THE INVENTION

The present invention relates to an ultrasonograph that generates ultrasonotomographic images from echo signals received on an ultrasonic probe and displays the ultrasonotomographic images. The present invention relates also to a method of generating ultrasonotomographic images from echo signals received on an ultrasonic probe, and to a generator program for generating ultrasonotomographic images.

BACKGROUND ARTS

Medical diagnosis that utilizes ultrasound imaging has recently been widely used in medical fields. The ultrasonic image is obtained by emitting ultrasonic wave from an ultrasonic probe toward a necessary body part and detecting ultrasonic echo from the body part as electric echo signals by use of an ultrasound observing device that is connected to the ultrasonic probe through a connector. It is also possible to obtain an ultrasonotomographic image by scanning with the ultrasonic wave.

As a concrete example of medical diagnosis utilizing ultrasound imaging, staging of esophagus cancer or stomach cancer based on ultrasonotomographic images has been disclosed, for example, from "Staging Of Esophagus Cancer With Fine Probe Ultrasonic Endoscope" by Hiroya OZAWA in DIGESTIVE ENDOSCOPE Vol. 14, No. 5, 2002. In this type of diagnosis, medical treatment for the patient is decided depending upon invasion degree of cancer especially into the sub mucous tissues, which are divided into three submucous tissue (sm) layers, as shown in FIG. 12.

However, because the mucosal (m) layer as laying on the muscularis mucosae (mm) and all the submucous tissue layers give rise to very strong high-echo that can often cause chroma clip in highlight range, that is, detail is lost or bleached out in high luminance range of subsequent ultrasonotomographic image. As a result, the muscularis mucosae and the three layered structure of the submucous tissues, which is referred to for checking if the cancer metastasizes to the lymph nodes or not, become indefinite on the image, so that it is hardly possible to make adequate diagnosis.

Meanwhile, an X-ray inspector has been suggested in U.S. Pat. No. 5,708,693 wherein an input image is decomposed into several images of different frequency bands. The images of different frequency bands are filtered through sequential statistic value filtering, and the filtered images are composed to obtain an output image. This is for the sake of reducing noises from the X-ray radiograph. Also an ultrasonic imaging device has been suggested in United States Patent Application Publication no. US2004/0073112, wherein structure-enhanced image data and texture-enhanced image data are extracted from an ultrasonotomographic image, and these image data are synthesized after being weighted respectively. In the structure-enhanced image data, the structure of living body tissues is enhanced. In the texture enhanced image data, texture pattern resulting from properties of living body tissues is enhanced.

Indeed the prior art disclosed in JP-A 10-505443 can reduce the noises from the X-ray radiograms, but data on details of the images, such as contours, remain as they are. The prior art disclosed in United States Patent Application Publication no. US2004/0073112 is designed to improve image quality by balancing in the image between the structure of the living body tissues and the texture resulting from the properties of the living body tissues. Therefore, both of these prior arts cannot hold down the bleaching in images of the mucosal layer and the submucous tissue layer.

Ordinary image processing, such as gain control and contrast control, may be useful for holding down the occurrence of the chroma clip in highlight range to some extent. But with such ordinary image processing, images of deeper layers of the living body, which are originally darker than other portions, would be more darkened together with other portions, causing chroma clip in shadow range. As a result, details are lost or blacked out in low luminance range of the subsequent image, so that the ultrasonic image as the whole becomes difficult to diagnose.

SUMMARY OF THE INVENTION

In view of the foregoing, a primary object of the present invention is to provide an ultrasonograph that can prevents chroma clip in both highlight and shadow ranges of ultrasonotomographic images and thus allows accurate diagnosis.

To achieve the above and other objects, an ultrasonograph of the present invention comprises an ultrasonic probe that scans a living body with ultrasonic wave and receives ultrasonic echo to output echo signals; a device for generating original image data $RAW_0$ of an ultrasonotomographic image by digitalizing the echo signals; a frequency component adjusting device for adjusting spatial frequency components of the original image data so as to avoid chroma clip in both highlight and shadow ranges of the ultrasonotomographic image; and a displaying device for displaying the ultrasonotomographic image based on output image data from the frequency component adjusting device.

According to a preferred embodiment, the frequency component adjusting device divides the spatial frequency components of the original image data $RAW_0$ into low frequency components including direct current components and other alternating current components, and makes the adjustment on the alternating current components and/or the low frequency component including direct current components.

More specifically, the frequency component adjusting device comprises an unsharp image data generating device for generating unsharp image data $RAW_i$ (i=1 to N, N=a positive integer) by reducing the spatial frequency components of the original image data $RAW_0$ in N steps; a subtraction device subtracting the unsharp image data $RAW_i$ from one another $RAW_{i-1}$ to generate differential image data $\Delta RAW_j$ (j=0 to N−1); a weighting device for weighting the differential image data $\Delta RAW_j$ by multiplying them by coefficients $k_j$ which are prepared for respective ones of the differential image data $\Delta RAW_j$; an integration device integrating the weighted differential image data $\Delta RAW_j$ to generate adjusted image data $RAW\_En$ whose spatial frequency components are adjusted by the coefficients $k_j$; and an addition device adding the adjusted image data $RAW\_En$ to the original image data $RAW_0$ to generate the output image data $RAW\_out$.

Among the coefficients $k_j$, at least one represented by $k_{N-1}$ has the smallest value and the values of the coefficients $k_j$ increases linear-functionally as the number j decreases, and gradient of the linear-functional curve of the coefficients $k_j$ is revisable. It is also possible to decide which of the coefficients $k_j$ has to have the largest value, on the assumption that the coefficient $k_{N-1}$ is the smallest.

According to another embodiment, the frequency component adjusting device comprises an unsharp image data generating device for generating unsharp image data $RAW_1$ by reducing the spatial frequency components of the original image data $RAW_0$; a device for generating biased image data $RAW_{img}$ from the unsharp image data $RAW_1$ with reference to a biasing table that extracts data of designated luminance ranges from the unsharp image data $RAW_1$; and a generating device adding said biased image data $RAW_{img}$ to said original image data $RAW_0$ or subtracting said biased image data $RAW_{img}$ from said original image data $RAW_0$ to generate said output image data RAW_out.

According to a further embodiment, the frequency component adjusting device comprises an unsharp image data generating device for generating unsharp image data $RAW_i$ (i=1 to N, N=a positive integer) by reducing the spatial frequency components of the original image data $RAW_0$ in N steps; a subtraction device subtracting the unsharp image data $RAW_i$ from one another $RAW_{i-1}$ to generate differential image data $\Delta RAW_j$ (j=0 to N−1); a weighting device for weighting the differential image data $\Delta RAW_j$ by multiplying them by coefficients $k_j$ which are prepared for respective ones of the differential image data $\Delta RAW_j$; an integration device integrating the weighted differential image data $\Delta RAW_j$ to generate adjusted image data RAW_En whose spatial frequency components are adjusted by the coefficients $k_j$; a device for generating biased image data $RAW_{img}$ from the unsharp image data $RAW_i$ with reference to a biasing table that extracts data of designated luminance ranges from the unsharp image data $RAW_i$; and an generating device adding said adjusted image data RAW_En to said original image data $RAW_0$, and adding or subtracting said biased image data $RAW_{img}$ to generate said output image data RAW_out that is finally output as said ultrasonotomographic image.

According to a preferred embodiment, the frequency component adjusting device further comprises a multiplication device for multiplying the adjusted image data RAW_En by a coefficient K ($0 \leq K \leq 1$) to decide a degree of influence of the adjustment of the spatial frequency components of the original image data $RAW_0$ on the output image data RAW_out.

A method of generating an ultrasonotomographic image comprising steps of scanning a living body with ultrasonic wave to detect echo signals; generating original image data of an ultrasonotomographic image of the living body by digitalizing the echo signals; and adjusting spatial frequency components of the original image data so as to avoid chroma clip in both highlight and shadow ranges of the ultrasonotomographic image.

The adjusting step preferably comprises steps of dividing the spatial frequency components of the original image data $RAW_0$ into low frequency components including direct current components, and other alternating current components, and adjusting the alternating current components and/or the low frequency components including direct current components.

Specifically, the adjusting step comprises steps of generating unsharp image data $RAW_i$ (i=1 to N, N=a positive integer) by reducing the spatial frequency components of the original image data $RAW_0$ in N steps; subtracting the unsharp image data $RAW_i$ from one another $RAW_{i-1}$ to generate differential image data $\Delta RAW_j$ (j=0 to N−1); weighting the differential image data $\Delta RAW_j$ by multiplying them by coefficients $k_j$ which are prepared for respective ones of the differential image data $\Delta RAW_j$; integrating the weighted differential image data $\Delta RAW_j$ to generate adjusted image data RAW_En whose spatial frequency components are adjusted by the coefficients $k_j$; and adding the adjusted image data RAW_En to the original image data $RAW_0$ to generate output image data RAW_out that is finally output as the ultrasonotomographic image.

According to another embodiment, the adjusting step comprises steps of generating unsharp image data $RAW_1$ by reducing the spatial frequency components of the original image data $RAW_0$; generating biased image data $RAW_{img}$ from the unsharp image data $RAW_1$ by extracting data of designated luminance ranges from the unsharp image data $RAW_1$ with reference to a biasing table; and adding said biased image data $RAW_{img}$ to said original image data $RAW_0$ or subtracting the biased image data $RAW_{img}$ from the original image data $RAW_0$ to generate the output image data RAW_out. In this embodiment, a high luminance range of the unsharp image data $RAW_1$ is enhanced and a middle luminance range thereof is held down by the biasing table.

According to another embodiment, the adjusting step comprises steps of generating device for generating unsharp image data $RAW_i$ (i=1 to N, N=a positive integer) by reducing the spatial frequency components of the original image data $RAW_0$ in N steps; a subtraction device subtracting the unsharp image data $RAW_i$ from one another $RAW_{i-1}$ to generate differential image data $\Delta RAW_j$ (j=0 to N−1); weighting the differential image data $\Delta RAW_j$ by multiplying them by coefficients $k_j$ which are prepared for respective ones of the differential image data $\Delta RAW_j$; integrating the weighted differential image data $\Delta RAW_j$ to generate adjusted image data RAW_En whose spatial frequency components are adjusted by the coefficients $k_j$; generating biased image data $RAW_{img}$ from the unsharp image data $RAW_i$ with reference to a biasing table that extracts data of designated luminance ranges from the unsharp image data $RAW_i$; and adding said adjusted image data RAW_En to said original image data $RAW_0$, and adding or subtracting said biased image data $RAW_{img}$ to generate output image data RAW_out that is finally output as said ultrasonotomographic image. In this embodiment, a high luminance range of the unsharp image data $RAW_i$ is held down and a middle luminance range thereof is enhanced by the biasing table.

It is preferable to multiply the adjusted image data RAW_En by a coefficient Ka ($0 \leq Ka \leq 1$) to decide a degree of influence of the adjustment of the alternating current components of the spatial frequency components of the original image data $RAW_0$.

It is more preferable to multiply the biased image data $RAW_{img}$ by a second coefficient Kb ($0 \leq Kb \leq 1$) to decide a degree of influence of the adjustment of the low frequency components including the direct current components of the spatial frequency components of the original image data $RAW_0$.

An ultrasonotomographic image generator program for a computer to generate an ultrasonotomographic image is configured to make the computer carry out the above mentioned steps of the inventive method.

Since the spatial frequency components of the original image data of the ultrasonotomographic image are so adjusted as to avoid chroma clip in both highlight and shadow ranges of the ultrasonotomographic image, accurate diagnosis is possible based on the displayed ultrasonotomographic image.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
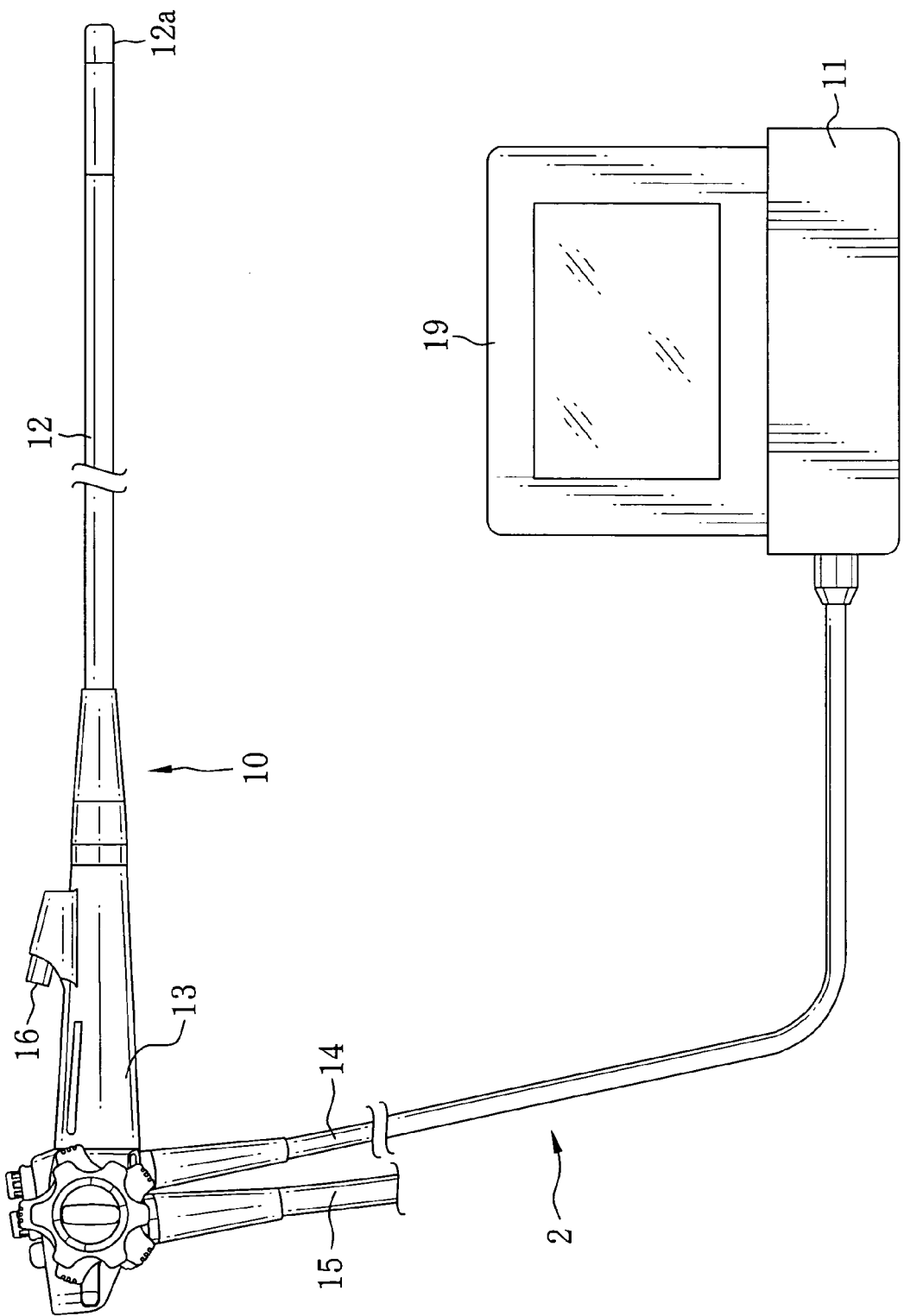
FIG. 1 is a schematic diagram illustrating an ultrasonograph according to an embodiment of the present invention.

FIG. 1 shows an ultrasonograph 2 that is mainly constituted of an ultrasonic endoscope 10, an ultrasonic observation device 11 and a not-shown light source. The ultrasonic endoscope 10 is provided with an inserting section 12 inserted into a living body, a handling section 13 coupled to a base end of the inserting portion 12, a connecting cord 14 connecting the ultrasonic endoscope 10 to the ultrasonic observation device 11, and an universal cord 15 connecting the ultrasonic endoscope 10 to the light source. The handling section 13 is provided with a clamping port 16 for accepting a tool for medical treatment. The inserting portion 12 has a tip portion 12a in which ultrasonic transducers 17 and imaging elements 18 of an imaging device are mounted, see FIG. 2.

The light source supplies illumination light through the universal cord 15 to the ultrasonic endoscope 10. The illumination light is projected toward a necessary part of the living body through an illumination window of the tip 12a. The tip 12a is provided with a not-shown observation window that has an objective optical system for forming an optical image of the body part to observe on the imaging device 18. The optical image taken through the imaging device 18 is displayed on a not-shown endoscope monitor that is specifically used for displaying optical images.

The ultrasonic endoscope 10 is a kind of intra-cavity diagnostic ultrasonic probe that scans the necessary part with ultrasonic wave from the ultrasonic transducer 17, to obtain an ultrasonotomographic image of the necessary part that is determined by observing the optical image of the internal body part on the not-shown endoscope monitor. For example, the ultrasonic endoscope 10 is of a linear scanning type, a convex scanning type, a sector scanning type or a radial scanning type. The ultrasonotomographic image obtained through the ultrasonic endoscope 10 is displayed on a monitor 19 of the ultrasonic observation device 11.

Figure 2:
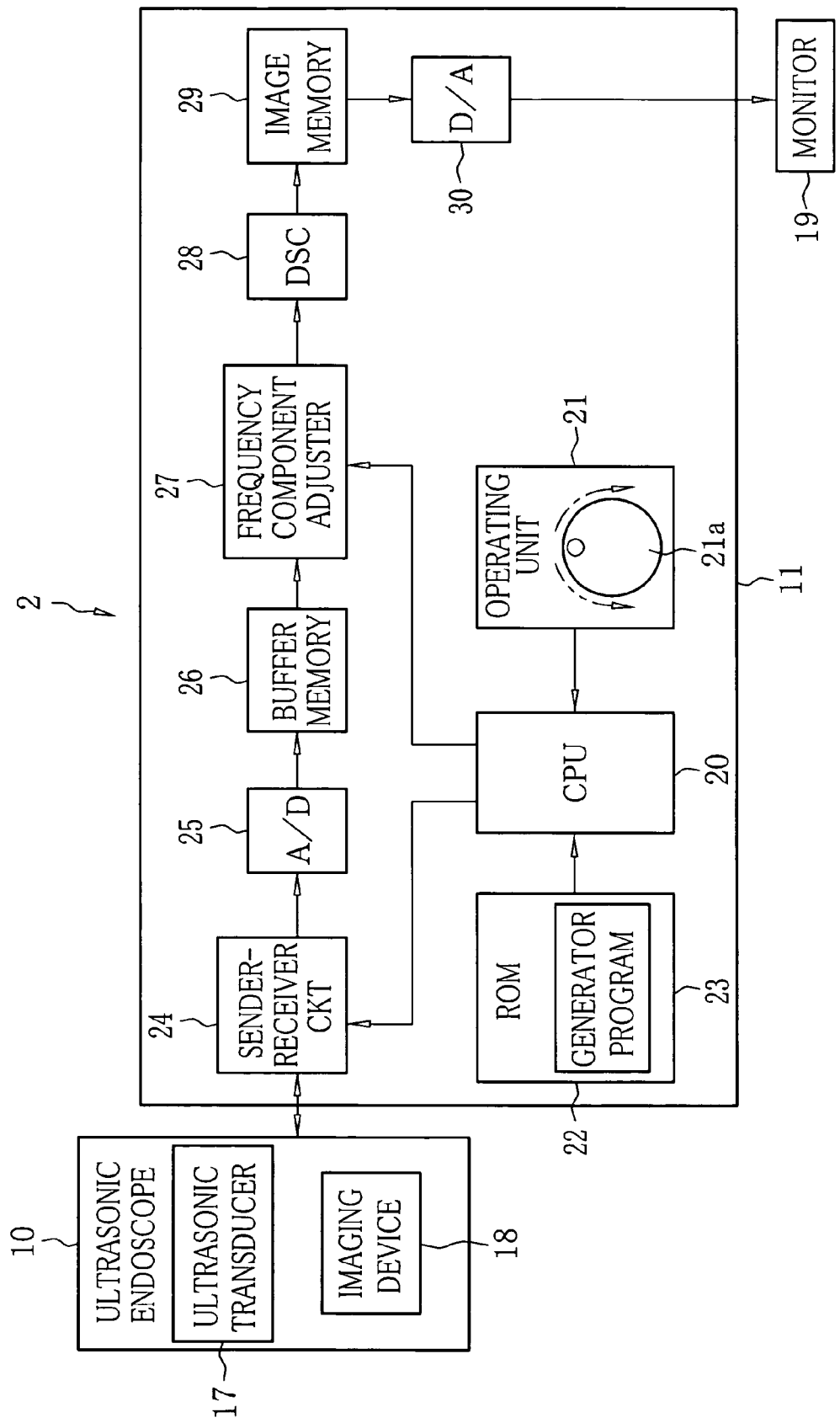
FIG. 2 is a block diagram illustrating an interior of the ultrasonograph of FIG. 1.

As shown in FIG. 2, the whole operation of the ultrasonic observation device 11 is controlled by a CPU 20. The CPU 20 is connected to an operating unit 21 having input devices such as a jog dial 21a, a keyboard or a mouse, and a ROM 23 storing various programs and data, including a generation program 22 for generating the ultrasonotomographic images. As will be described later, the jog dial 21a is used for varying coefficients $k_j$ and K. The CPU 20 controls operations of respective parts of the ultrasonic observation device 11 in response to operation signals entered through the operating unit 21, and executes processing of various kinds in accordance with the generation program 22 read out from the ROM 23.

Under the control of the CPU 20, a sender-receiver circuit 24 manages sending of drive signals to the ultrasonic transducer 17, which are voltage pulses for exiting the ultrasonic transducer 17, as well as receiving of echo signals that are obtained from the living body through the ultrasonic transducer 17. That is, the sender-receiver circuit 24 controls timing of switching of these signals and selects the ultrasonic transducer 17 to drive.

The echo signals received on the sender-receiver circuit 24 is fed to an A/D converter 25, which converts the echo signals into a digital form, and outputs them to a buffer memory 26. The buffer memory 26 temporarily stores the digitalized echo signals, i.e. original image data $RAW_0$, see FIG. 3.

Figure 3:
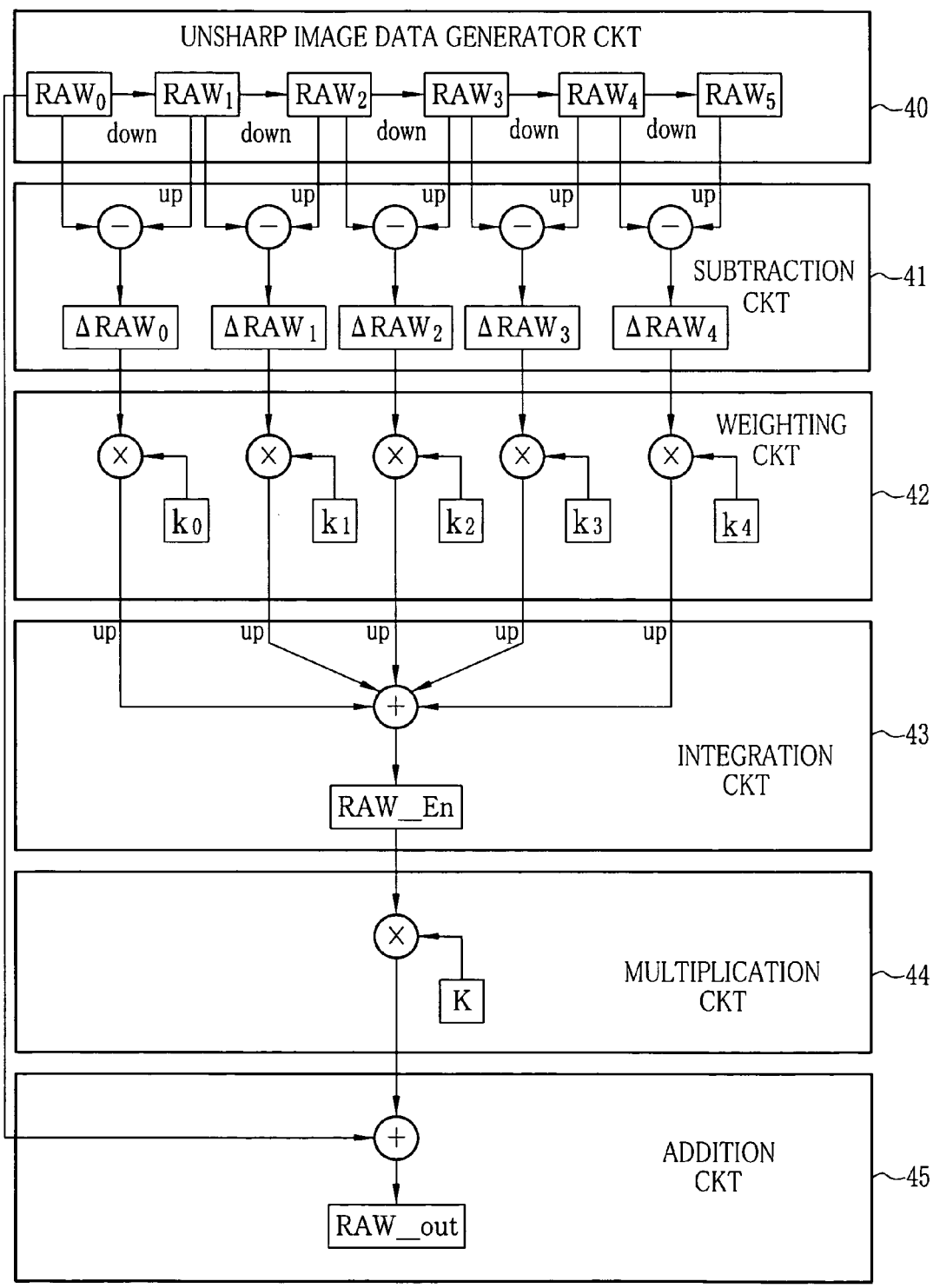
FIG. 3 is a block diagram illustrating an interior of a frequency component adjuster of the ultrasonograph.

A frequency component adjuster 27 adjusts spatial frequency components of the original image data $RAW_0$. As shown in FIG. 3, the frequency component adjuster 27 is constituted of an unsharp image data generator 40, a subtraction circuit 41, a weighting circuit 42, an integration circuit 43, a multiplication circuit 44 and an addition circuit 45.

The unsharp image data generator circuit 40 reads out the original image data $RAW_0$ from the buffer memory 26, and generates unsharp image data $RAW_i$ (i=1 to 5) by reducing the spatial frequency components of the original image data $RAW_0$ in five steps. Concretely, the unsharp image data generator circuit 40 subjects the original image data $RAW_0$ to thinning or pixel-skipping and filtration through a Nyquist filter, to generate first unsharp image data $RAW_1$ whose resolution and size are half the original ones. Next, the first unsharp image data $RAW_1$ is subjected to the same processes as the original image data $RAW_0$, to get second unsharp image data $RAW_2$ whose resolution and size are half the first unsharp image data $RAW_1$. Repeating the same processes as above, third to fifth unsharp image data $RAW_3$ to $RAW_5$ are generated. Accordingly, the unsharp image data $RAW_i$ become less sharper as the number "i" increases.

The subtraction circuit 41 generates differential image data $\Delta RAW_j$ (j=1 to 4). In the subtraction circuit 41, the unsharp image data $RAW_i$, which is generated from the unsharp image data generator circuit 40, is subjected to a smoothing process, whereby the unsharp image data $RAW_i$ is interpolated with thinned data to recover the same size as the unsharp image data $RAW_{i-1}$, and then the data $RAW_i$ is subtracted from the data $RAW_{i-1}$, to get the differential image data $\Delta RAW_j$.

Provided that $f_i$ represents the spatial frequency components of the respective image data $RAW_i$, including the original image data $RAW_0$, spatial frequency components $\Delta f_j$ of the differential image data $\Delta RAW_j$ can be held approximately equal to a value $(f_i - f_{i-1})$. Therefore, the differential image data $\Delta RAW_j$ can be held as data groups that are obtained by dividing the spatial frequency components of the original image data $RAW_0$ by a given frequency band width.

Figure 4:
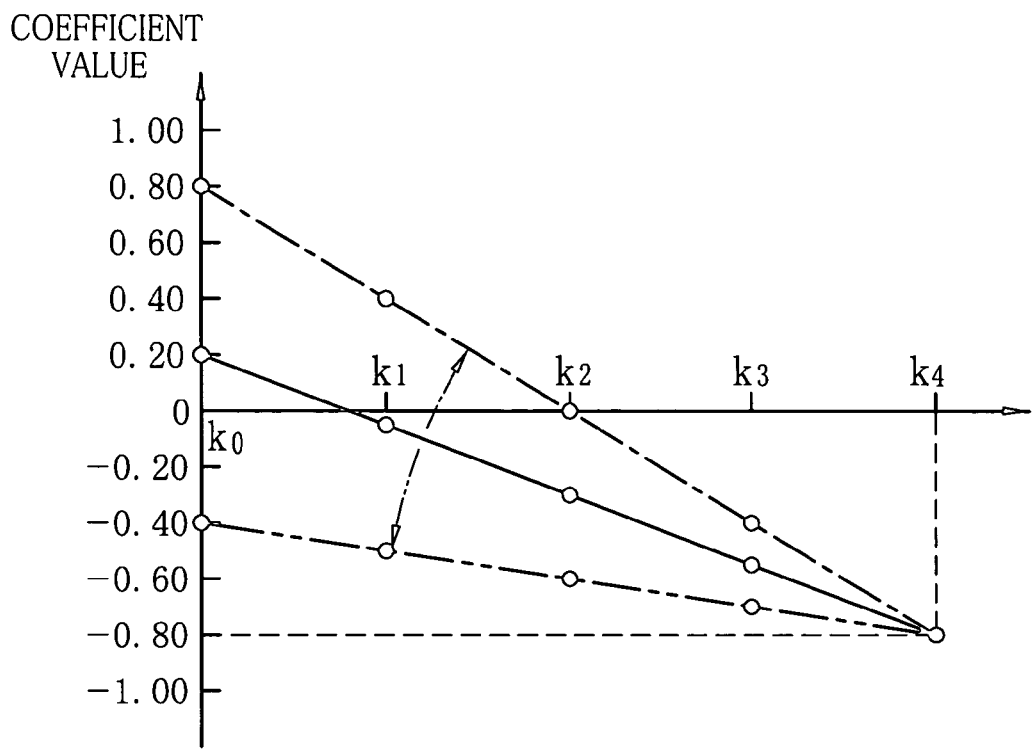
FIG. 4 is a graph illustrating variations in weighting coefficients for differential image data.

The weighting circuit 42 weights the differential image data $\Delta RAW_j$ by multiplying them by coefficients $k_j$ ($-1 < k_j < 1$), which are prepared for the respective differential image data $\Delta RAW_j$. As shown in FIG. 4, the coefficient k4 for the fourth differential image data $\Delta RAW_4$ is minus 0.80, that is the smallest among the coefficients $k_j$, and the coefficients $k_j$ increase linear functionally as the number "j" decreases.

The gradient of the coefficients $k_j$ can be modified by turning the jog dial 21a of the operating unit 21. By turning the jog dial 21a clockwise, as shown by a chain-dotted line in FIG. 2, the coefficients $k_0$ to $k_3$ are shifted upward while keeping the coefficient $k_4$ as a reference point, so that the gradient of the coefficients $k_j$ is made steeper as shown by a chain-dotted line in FIG. 4. As a result, a subsequent ultrasonotomographic image will become a hard gradation image whose luminance vary relatively largely.

On the contrary, by turning the jog dial 21a counterclockwise, as shown by a phantom line in FIG. 2, the coefficients $k_0$ to $k_3$ are shifted downward while keeping the coefficient $k_4$ as the reference point, so that the gradient of the coefficients $k_j$ is made gentler as shown by a phantom line in FIG. 4. As a result, a subsequent ultrasonotomographic image will become a soft gradation image whose luminance variations are relatively small.

Referring back to FIG. 3, the integration circuit 43 makes the differential image data $\Delta RAW_j$ as weighted by the weighting circuit 42 have the same size as the original image data $RAW_0$, and then integrates the differential image data $\Delta RAW_j$ to generate adjusted image data RAW_En whose spatial frequency components are adjusted by the coefficients $k_j$.

The multiplication circuit 44 multiplies the adjusted image data RAW_En, as generated from the integration circuit 43, by a coefficient K ($0 \leq K \leq 1$). The coefficient K is for deciding final degree of influence of the spatial frequency component adjustment on the original image data $RAW_0$ by the frequency component adjuster 27. If the coefficient K is zero, the adjustment by the frequency component adjuster 27 results no effect, so the original image data $RAW_0$ is output as output image data RAW_out, which is output from the frequency component adjuster 27 as set forth in more detail below. If, on the other hand, the coefficient K is 1, the adjustment by the frequency component adjuster 27 is wholly reflected in the output image data RAW_out. The coefficient K has a value that is variable by turning the jog dial 21a, like as the coefficients $k_j$.

The addition circuit 45 adds the original image data $RAW_0$ to the adjusted image data RAW_En after being multiplied by the coefficient K, to generate the output image data RAW_out, representative of a final ultrasonotomographic image.

Referring back to FIG. 2, a digital scan converter (DSC) 28 converts the output image data RAW_out, which is generated from the addition circuit 45 of the frequency component adjuster 27, into an image signal of a TV signal scanning format, i.e. a NTSC signal, under the control of the CPU 20. The NTSC signal is stored in an image memory 29. A D/A converter 30 reads out the NTSC signal from the image memory 29, and converts it again into an analog signal. Based on the analog signal from the D/A converter 30, a monitor 10 displays an ultrasonotomographic image.

Figure 5:
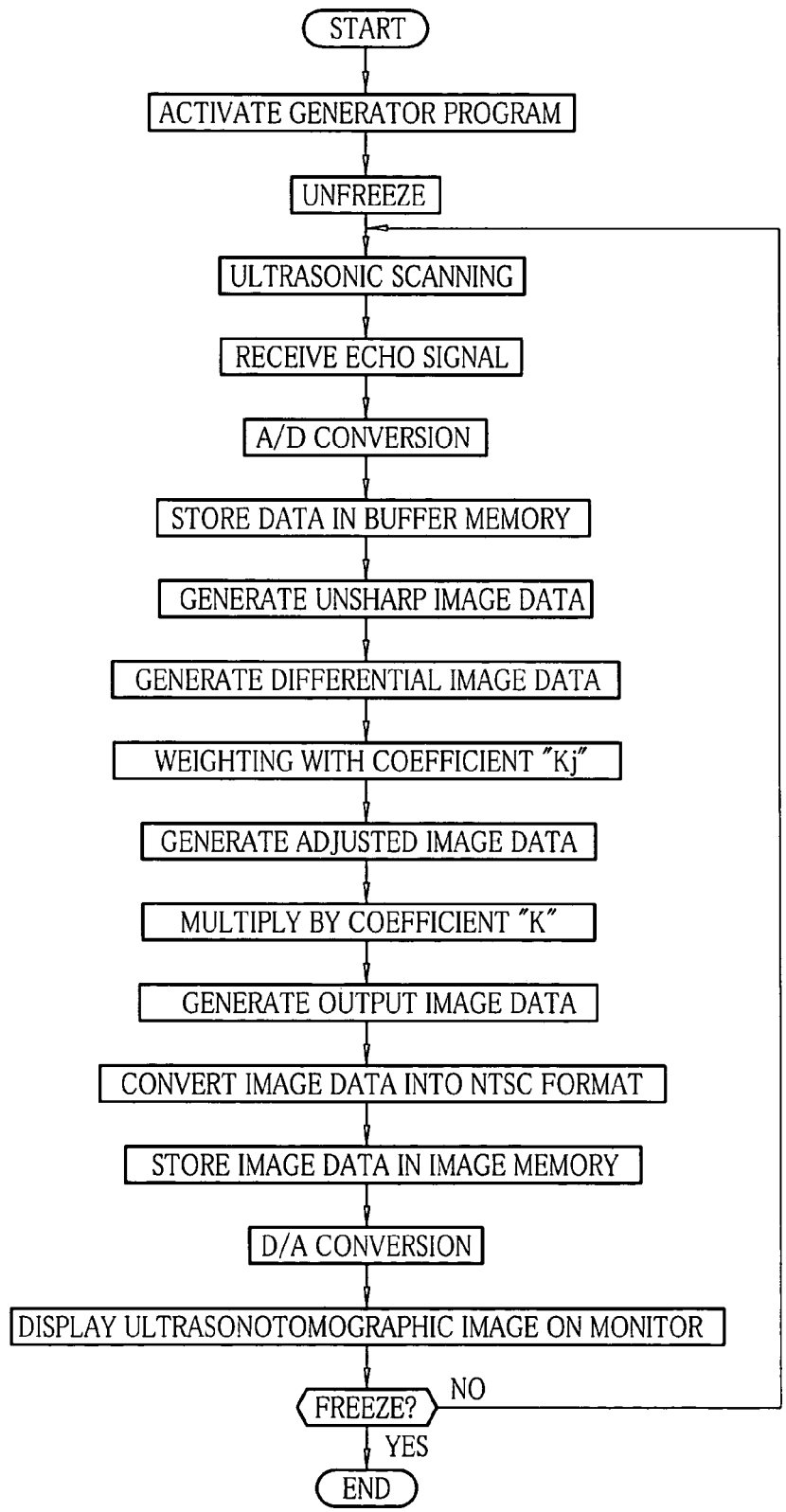
FIG. 5 is a flowchart illustrating an operation sequence of the ultrasonograph.

Now the operation of the ultrasonograph 2 configured as above will be described with reference to the flow chart of FIG. 5. After powering the ultrasonic observation device 11 on to activate the generator program 22, the inserting portion 12 of the ultrasonic endoscope 10 is inserted into a living body, to search for a particular internal body part while observing images taken through the imaging device 18. When the tip 12a of the inserting portion 12 reaches the particular internal body part and the operating unit 21 is operated to unfreeze, the drive signals are sent from the sender-receiver circuit 24 to the ultrasonic transducer 17 under the control of the CPU 20. The drive signals excite the ultrasonic transducer 17 to emit ultrasonic wave toward the particular internal body part.

After sending the drive signals, the sender-receiver circuit 24 is switched over under the control of the CPU 20, to receive echo signals that are obtained by the ultrasonic transducer 17 from the internal body part.

The echo signals received on the sender-receiver circuit 24 are digitalized through the A/D converter 25, and are stored temporarily in the buffer memory 26. The digitalized echo signals are read out from the buffer memory 26 by the frequency component adjuster 27.

In the frequency component adjuster 27, the unsharp image data generator circuit 40 generates the unsharp image data $RAW_i$ by reducing the spatial frequency components of the original image data $RAW_0$ in five steps. Next, the subtraction circuit 41 makes the unsharp image data $RAW_i$ have the same size as the unsharp image data $RAW_{i-1}$, and thereafter subtracts the unsharp image data $RAW_i$ from the unsharp image data $RAW_{i-1}$ to generate the differential image data $\Delta RAW_j$.

The weighting circuit 42 weights the differential image data $\Delta RAW_j$ by multiplying them by the coefficients $k_j$. Next, the integration circuit 43 makes the weighted differential image data $\Delta RAW_j$ have the same size as the original image data $RAW_0$, and then integrates the differential image data $\Delta RAW_j$ to generate the adjusted image data RAW_En.

Thereafter, the multiplication circuit 44 multiplies the adjusted image data RAW_En by the coefficient K. Finally, the addition circuit 45 adds the original image data $RAW_0$ to the adjusted image data RAW_En as being multiplied by the coefficient K, to generate the output image data RAW_out representative of the final ultrasonotomographic image.

The output image data RAW_out is converted into the NTSC signal through the DSC 28, and is sent to the image memory 29. Thereafter, the output image data RAW_out is converted again into the analog form through the D/A converter 30, to be displayed as the ultrasonotomographic image on the monitor 19.

When the jog dial 21a is turned clockwise, the gradient of the coefficients $k_j$ is made steeper to output a hard image. On the contrary, when the jog dial 21a is turned counterclockwise, the gradient of the coefficient $k_j$ is made gentler to output a soft image. When the coefficient K is set at zero by turning the jog dial 21a, the original image data $RAW_0$ is output as the output image data RAW_out. On the contrary, when the coefficient K is set at 1, the output image data RAW_out reflects all the results of adjustment by the frequency component adjuster 27.

Figure 6:
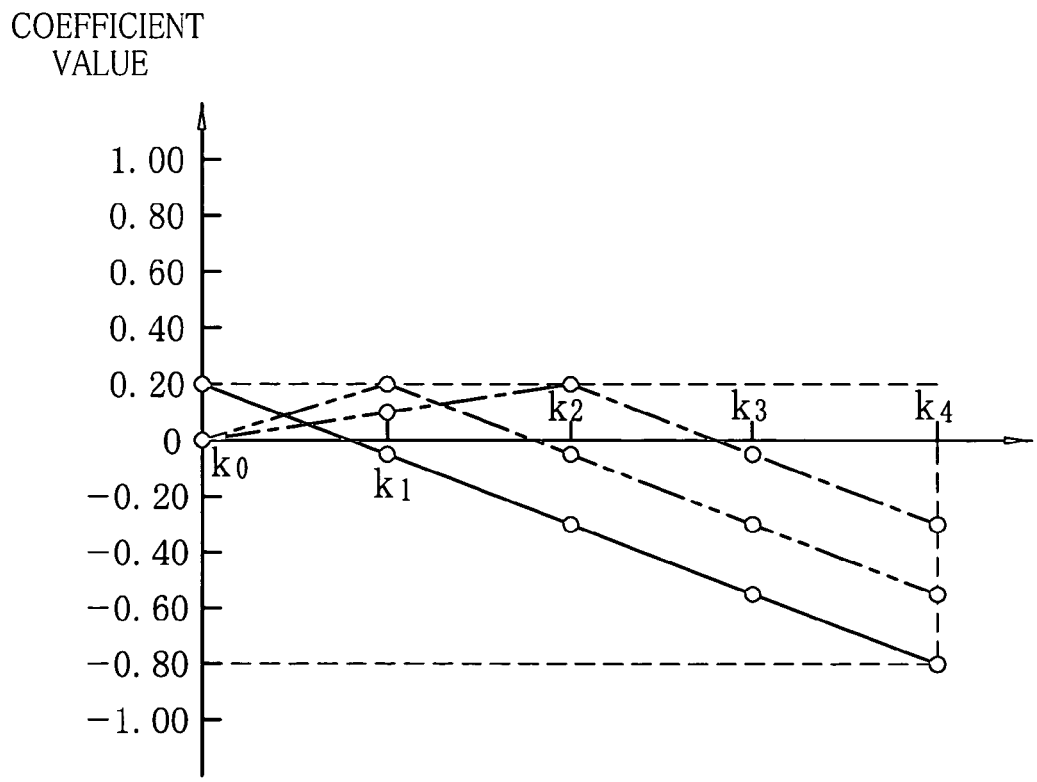
FIG. 6 is a graph illustrating another example of variations in weighting coefficients for differential image data.

According to another embodiment, the coefficients $k_j$ may be variable not only in gradient but also in maximum value. In the embodiment shown in FIG. 6, the maximum value of the coefficients $k_j$ is 0.2, and the coefficient $k_j$ having the maximum value is shifted seriatim from $k_0$ to $k_1$ to $k_2$ as the jog dial 21a turns. This embodiment is effective to prevent unnecessary enhancement of details of the ultrasonotomographic image if the display range is so narrow that the tissues of the particular internal body part can be seen in detail.

Figure 7:
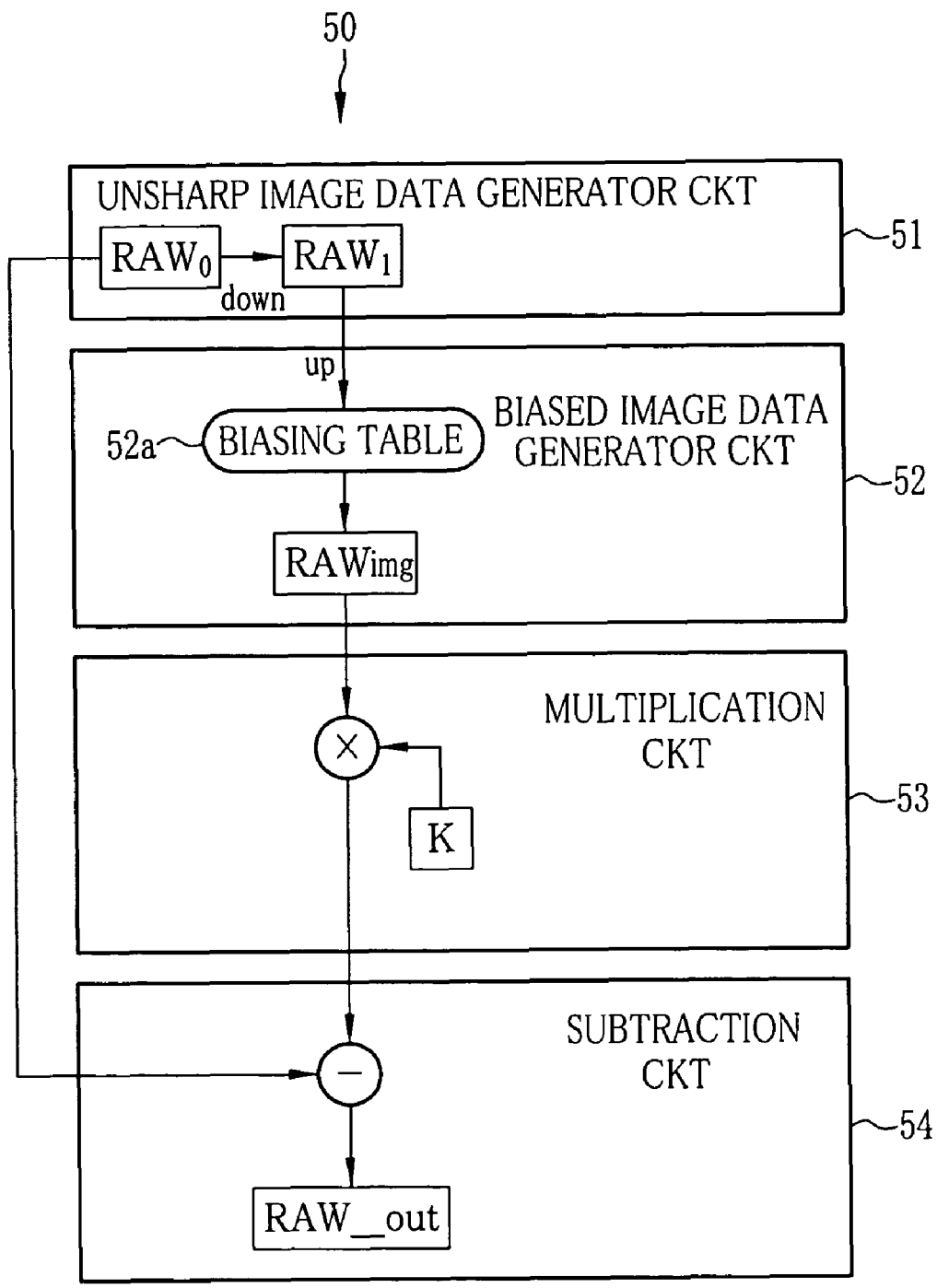
FIG. 7 is a block diagram illustrating a frequency component adjuster according to another embodiment of the present invention.

FIG. 7 shows another embodiment of a frequency component adjuster 50, which is constituted of an unsharp image data generator circuit 51, a biased image data generator circuit 52, a multiplication circuit 53 and a subtraction circuit 54. The frequency component adjuster 50 is designed to obtain ultrasonotomographic images whose low frequency components are held down in high luminance range by a well-known dynamic range compression that is disclosed for example in Japanese Laid-open Patent Application No. 10-75364.

The unsharp image data generator circuit 51 reads out the original image data $RAW_0$ from the buffer memory 26, to generate unsharp image data RAW1 by reducing spatial frequency components from the original image data $RAW_0$ down to a data volume of 1/M, e.g. ½, of the original, using the same method as described with respect to the unsharp image data generator circuit 40 of FIG. 3.

Figure 8:
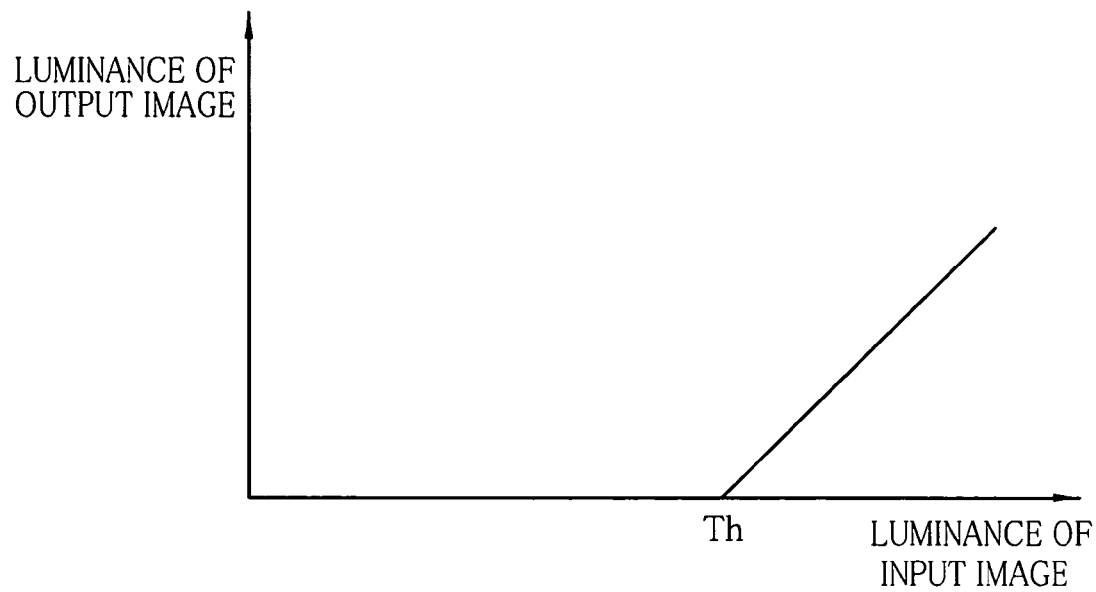
FIG. 8 is a graph illustrating a content of a biasing table.

The biased image data generator circuit 52 makes the unsharp image data $RAW_1$ recover the same size as the original image data $RAW_0$ and, thereafter, generates biased image data $RAW_{img}$ with reference to a biasing table 52a. As shown in FIG. 8, the biasing table 52a is for extracting image data in a high luminance range from the unsharp image data $RAW_1$, and is designed to output merely those input image data whose luminance is not less than a given threshold value Th.

Referring back to FIG. 7, the multiplication circuit 53 multiplies the biased image data $RAW_{img}$, which is generated from the biased image data generator circuit 52, by a coefficient K that decides final degree of influence of the adjustment of the spatial frequency components of the original image data $RAW_0$ by the frequency component adjuster 50, like the multiplication circuit 44 of FIG. 3. The subtraction circuit 54 subtracts the biased image data $RAW_{img}$ as being multiplied by the coefficient K in the multiplication circuit 53, from the original image data $RAW_0$ to generate output image data RAW_out, which is output as a final ultrasonotomographic image from the frequency component adjuster 50.

Like the frequency component adjuster 27 of FIG. 3, the coefficient K has a value variable by turning the jog dial 21a. It is also possible to change the value M that decides the degree of data volume reduction on generating the unsharp image data $RAW_1$ from the original image data $RAW_0$, and the biasing table 52a as well. It is possible to provide a specific operation member for changing the value M or one for changing the biasing table separately from the jog dial 21a.

Unlike the frequency component adjuster 27, the embodiment using the frequency component adjuster 50 does not need to generate five groups of unsharp image data, so that the following differential operation, the weighting with the coefficients $k_j$ and the integration are omitted. Accordingly, the embodiment using the frequency component adjuster 50 simplifies the circuit structure and the processing in comparison with the embodiment using the frequency component adjuster 27. Note that the ultrasonograph 2 using the frequency component adjuster 50 operates fundamentally in the same sequence as shown in FIG. 2, except that the biased image data $RAW_{img}$ is generated. Therefore, the description and illustration of the operation sequence of the embodiment of FIG. 7 will be omitted.

Figure 9:
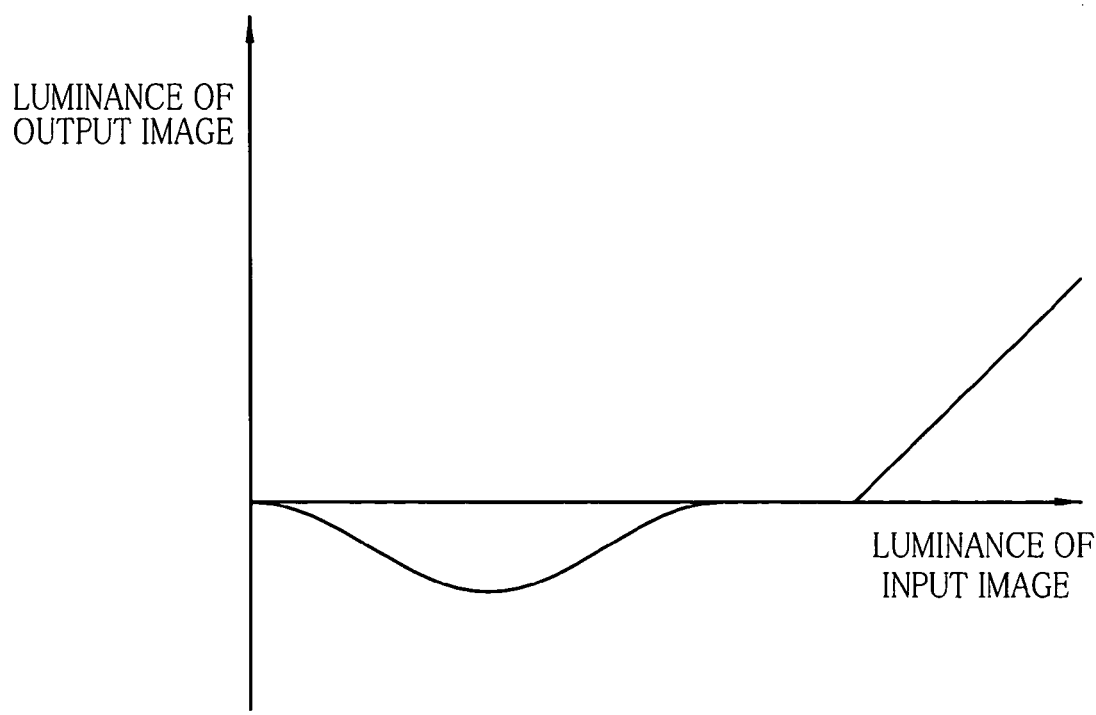
FIG. 9 is a graph illustrating a content of a biasing table according to another embodiment of the present invention.

The biasing table 52a may have another characteristic curve as shown in FIG. 9. The curve shown in FIG. 9 is designed to enhance the unsharp image data $RAW_1$ in a high luminance range and hold it down in a middle luminance range. With the biasing table 52a having the curve shown in FIG. 8, the output image data RAW_out will be reduced in the high luminance range from the original image data $RAW_0$, so the obtained image can be generally dark. On the other hand, where the biasing table 52a has the curve shown in FIG. 9, the output image data RAW_out will be reduced in the high luminance range but enhanced in the middle luminance range. Consequently, the luminance reduction of the output image data RAW_out is limited in total.

Figure 10:
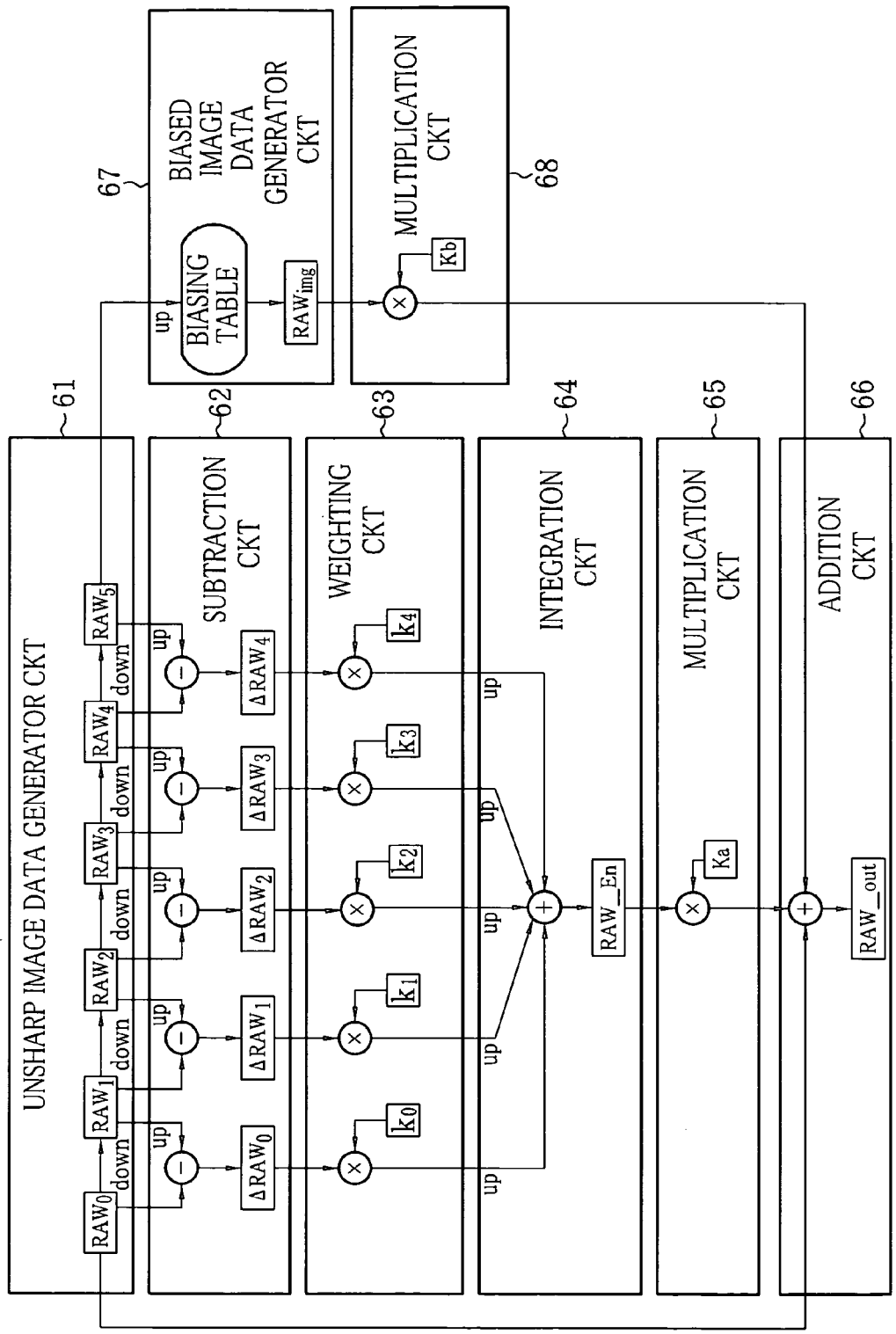
FIG. 10 is a block diagram illustrating a frequency component adjuster according to still another embodiment of the present invention.

FIG. 10 shows a further embodiment of a frequency component adjuster 60, which is a combination of the frequency component adjuster 27 of FIG. 3 and the frequency component adjuster 50 of FIG. 7. In the frequency component adjuster 60, a biased image data generator circuit 67 generates biased image data $RAW_{img}$ from unsharp image data RAW5, and multiplication circuits 65 and 68 multiply adjusted image data RAW_En and the biased image data $RAW_{img}$ by coefficients Ka and Kb respectively, which correspond to the coefficient K of the above embodiment. An addition circuit 66 adds the adjusted image data RAW_En, the biased image data $RAW_{img}$ and original image data $RAW_0$ to generate output image data RAW_out.

Also in this embodiment, it is possible to change the coefficients $k_j$ and K, the value M for data volume reduction, and a biasing table by operating the jog dial 21a, like in the frequency component adjuster 27 of FIG. 3 and the frequency component adjuster 50 of FIG. 7.

The frequency component adjuster 60 is more complicated in circuit structure and processing sequence, but it permits finer adjustment. Although the biased image data $RAW_{img}$ is generated from the unsharp image data $RAW_5$ in the embodiment of FIG. 10, it is possible to generate the biased image data $RAW_{img}$ from any of other unsharp image data $RAW_1$ to $RAW_4$. Furthermore, the frequency component adjuster 60 adds the biased image data $RAW_{img}$ to generate the output image data RAW_out, on the contrary to the frequency component adjuster 50 where the biased imaged data $RAW_{img}$ is subtracted from the original image data $RAW_0$ to get the output image data RAW_out. Therefore, the biasing table used in the biased image data generator circuit 67 has a curve inverted to the curve shown in FIG. 8 or 9, in polarity of the luminance of the output data.

Generally, frequency components of signals consist of low frequency components, including direct current components, and other alternating current components. The same applies to the image signals. Assuming that I, $I_{DC}$ and $I_{AC}$ represent the total image signal, the low frequency components including the direct current components, and the alternating current components respectively, the total image signal I may be expressed as follows:

$$I = I_{DC} + I_{AC}.$$

Since the frequency component adjuster 27 carries out the adjustment by weighting the band-divided differential image data $\Delta RAW_j$ by the respective coefficients $k_j$ and adding them to the original image data $RAW_0$, the low frequency components $I_{DC}$ of the original image data $RAW_0$, including the direct current components, are maintained unchanged, whereas other alternating current components $I_{AC}$ are subjected to the adjustment. Accordingly, the adjustment by the frequency component adjuster 27 can be equivalently expressed by the following equation (1), provided that the output image signal obtained as the result of the adjustment is represented by Iout:

$$I\text{out} = I_{DC} + \beta(I_{AC}) \tag{1}$$

$$\beta(I_{AC}) = \beta 0(I_{AC}0) + \beta 1(I_{AC}1) + \beta 2(I_{AC}2) + \beta 3(I_{AC}3) + \beta 4(I_{AC}4) \tag{2}$$

wherein $\beta(I_{AC})$ corresponds to the adjusted image data RAW_En, $I_{AC}0$ to $I_{AC}4$ correspond to the respective differential image data $\Delta RAW_0$ to $\Delta RAW_4$, and $\beta(\ )$ corresponds to the multiplication by the coefficients $k_j$ and K.

Since the frequency component adjuster 50 of FIG. 7 carries out the adjustment by generating the biased image data $RAW_{img}$ from the unsharp image data $RAW_1$ that has the flow frequency components including the direct current components $I_{DC}$, and adding it to the original image data $RAW_0$, the alternating current components $I_{AC}$ of the original image data $RAW_0$ are maintained unchanged, whereas the flow frequency components including the direct current components $I_{DC}$ are subjected to the adjustment. Accordingly, the adjustment by the frequency component adjuster 50 can be equivalently expressed by the following equation (3):

$$Iout = \alpha(I_{DC}) + I_{AC} \qquad (3)$$

wherein $\alpha(I_{DC})$ corresponds to the biased image data $RAW_{img}$, $I_{DC}$ corresponds to the unsharp image data $RAW_1$, and $\alpha(\ )$ corresponds to the processing with the biasing table.

The adjustment by the frequency component adjuster 60 shown in FIG. 10 can be equivalently expressed by the following equation (4):

$$Iout = \alpha(I_{DC}) + \beta(I_{AC}) \qquad (4)$$

It is to be noted that the processing expressed by $\alpha(\ )$ and $\beta(\ )$ in the equations (1) to (4) may be either the linear processing with the coefficients or the non-linear processing with the table.

Although the equation (1) does not directly express the adjustment by the frequency component adjuster 27, the combination of the equations (1) and (2) is equivalent to the adjustment by the frequency component adjuster 27:

$$Iout = I_{DC} + k'_0 \cdot I_{AC0} + k'_1 \cdot I_{AC1} + k'_2 \cdot I_{AC2} + k'_3 \cdot I_{AC3} + k'_4 \cdot I_{AC4}$$

$$I = I_{DC} + I_{AC}$$

$$Iout = I - I_{AC} + k'_0 \cdot I_{AC0} + k'_1 \cdot I_{AC1} + k'_2 \cdot I_{AC2} + k'_3 \cdot I_{AC3} + k'_4 \cdot I_{AC4}$$

$$= I + (k'_0 - 1) \cdot I_{AC0} + (k'_1 - 1) \cdot I_{AC1} + (k'_2 - 1) \cdot I_{AC2} + (k'_3 - 1) \cdot I_{AC3} + (k'_4 - 1) \cdot I_{AC4}$$

$$= I + k_0 \cdot I_{AC0} + k_1 \cdot I_{AC1} + k_2 \cdot I_{AC2} + k_3 \cdot I_{AC3} + k_4 \cdot I_{AC4}$$

wherein "I" corresponds to the original image data $RAW_0$, and $Iout = I$ when $k'_j = 1$ and $k_j = 0$).

In the same way, the equation (3) may be expressed as follows:

$$Iout = \alpha(I_{DC}) + I - I_{DC}$$
$$= \{\alpha(I_{DC}) - I_{DC}\} + I$$
$$= LUT(I_{DC}) + I$$

wherein $LUT(I_{DC})$ corresponds to the processing with the biasing table, so the equation (3) represents the adjustment by the frequency component adjuster 50.

As described so far, according to the present invention, the frequency component adjuster 27 or 50 or 60 adjusts the spatial frequency components of the original image data $RAW_0$ for the ultrasonotomographic image so as to avoid chroma clip in both highlight and shadow ranges of the ultrasonotomographic image, so that the ultrasonotomographic image shows details throughout the whole luminance ranges. Consequently, the ultrasonograph 2 of the present invention can extract the muscularis mucosae (mm layer) and the triple-layered structure of the submucous tissue layer (sm layer) of esophagus or stomach wall with higher probability, so it helps improving diagnostic exactness, for example, in examining the degree of invasion for the staging of esophagus cancer or stomach cancer.

In the frequency component adjuster 50 shown in FIG. 7, the biased imaged data $RAW_{img}$ is generated by using the biasing table shown in FIGS. 8 and 9, and the biased imaged data $RAW_{img}$ is subtracted from the original image data $RAW_0$ at the subtraction circuit 54 to generate output image data RAW_out. However, the present invention may be configured to use the biasing table having a curve inverted to the curve shown in FIG. 8 or 9, in polarity of the luminance of the output data, and add the biased imaged data $RAW_{img}$ to the original image data $RAW_0$ to generate output image data RAW_out. Moreover, in the frequency component adjuster 60 shown in FIG. 10, the biased imaged data $RAW_{img}$ is generated by using the biasing table having a curve inverted to the curve shown in FIG. 8 or 9, in polarity of the luminance of the output data, and the biased imaged data $RAW_{img}$ is added to the original image data $RAW_0$ at the addition circuit 66 to generate output image data RAW_out. However, the present invention may be configured to use the biasing table shown in FIGS. 8 & 9, and subtract the biased imaged data $RAW_{img}$ from the original image data $RAW_0$ to generate output image data RAW_out. That is to say, the present invention may be configured to generate output image data RAW_out to hold down a high luminance range when the biasing table shown in FIG. 8 is used, or may be configured to generate output image RAW_out to hold down a high luminance range and enhance a middle luminance range when the biasing table shown in FIG. 9 is used.

Figure 11:
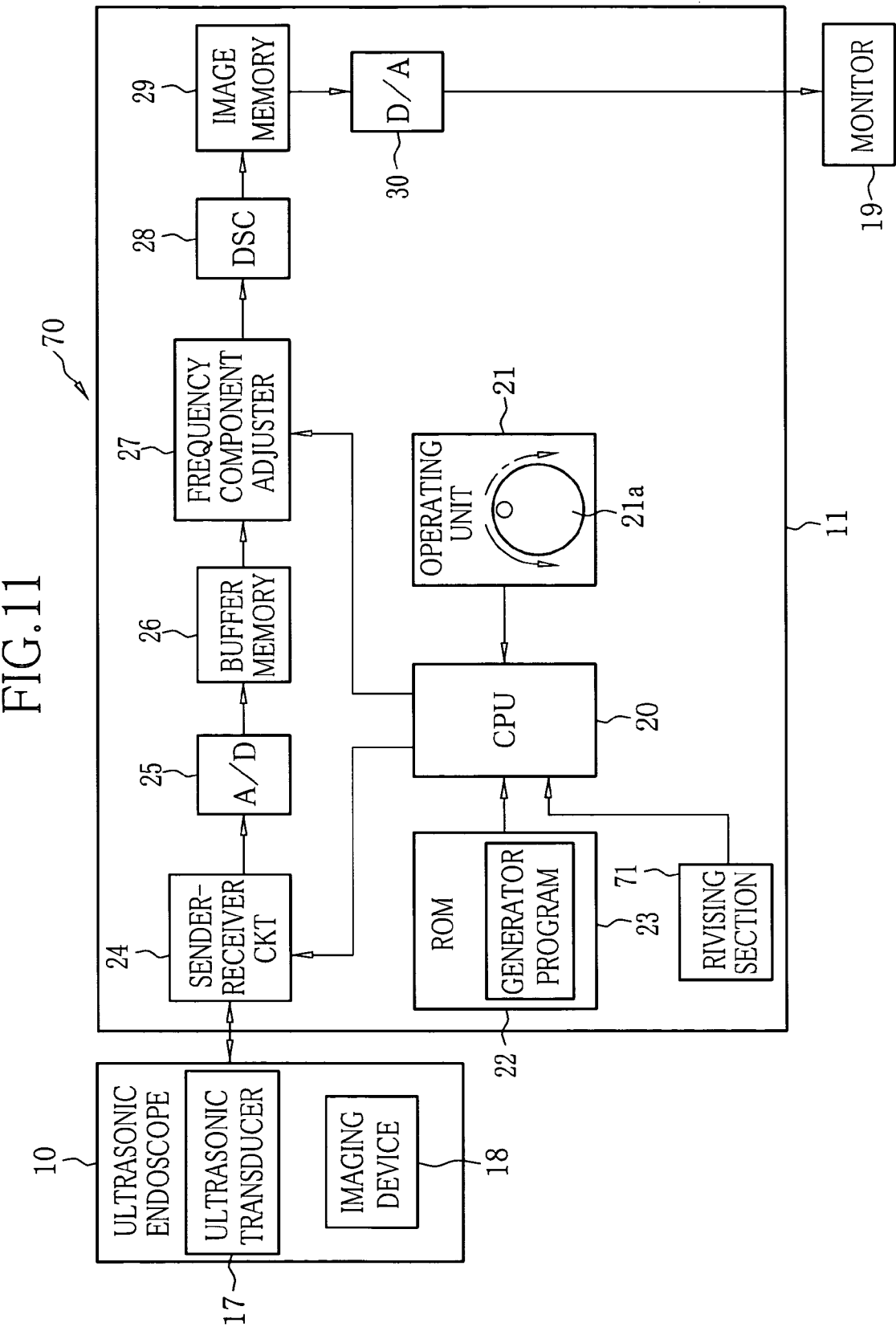
FIG. 11 is a block diagram illustrating an interior of the ultrasonograph according to another embodiment of the present invention.
Figure 12:
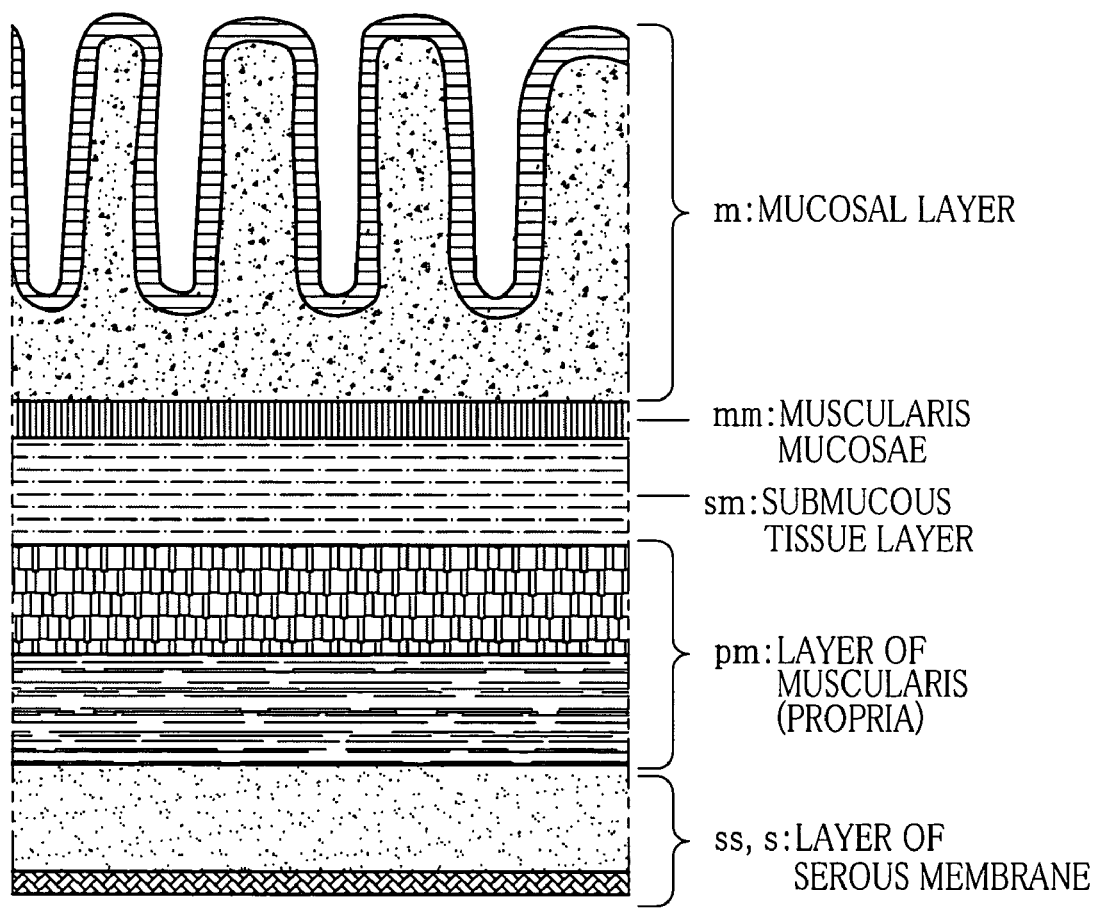
FIG. 12 is an enlarged sectional view illustrating tissues of stomach wall.

As shown in FIG. 11, it is possible to provide an ultrasonograph 70 with a revising section 71 for revising at least one of the coefficients $k_j$ and K, the value M and the biasing table, depending upon at least one of such data that represent the internal body part to observe, the frequency of the ultrasonic wave from an ultrasonic transducer 17, and a display depth of the ultrasonotomographic image. This embodiment permits obtaining proper ultrasonotomographic images automatically in accordance with conditions of usage of the ultrasonic endoscope 10.

Although the illustrated ultrasonic endoscope 10 is for intra-cavity diagnosis and has the imaging device 18 incorporated therein, the present invention is applicable to an ultrasonograph using a fine ultrasonic probe that has ultrasonic transducers alone, and is put into a clamping port of an electronic endoscope when the probe is used. The present invention is also applicable to a case using an extra-cavity diagnostic ultrasonic probe that is moved on a body surface for obtaining an ultrasonic image.

Thus, the present invention is not to be limited to the above embodiments but, on the contrary, various modifications will be possible without departing from the scope of claims appended hereto.

What is claimed is:

1. An ultrasonograph comprising:
   an ultrasonic probe configured to scan a living body with ultrasonic wave and receives ultrasonic echo to output echo signals;
   a device for generating original image data $RAW_0$ of an ultrasonotomographic image by digitalizing said echo signals;
   a frequency component adjusting device for adjusting spatial frequency components of said original image data so as to avoid chroma clip in both highlight and shadow ranges of said ultrasonotomographic image; and
   a displaying device for displaying said ultrasonotomographic image based on output image data from said frequency component adjusting device,
   wherein said frequency component adjusting device comprises:
   an unsharp image data generating device for generating unsharp image data $RAW_i$ (i=1 to N, N=a positive integer) by reducing the spatial frequency components of said original image data $RAW_0$ in N steps;
   a subtraction device subtracting said unsharp image data $RAW_i$ from one another RAWi−1 to generate differential image data $\Delta RAW_j$ (j=0 to N−1);

a weighting device for weighting said differential image data $\Delta RAW_j$ by multiplying them by coefficients kj which are prepared for respective ones of said differential image data $\Delta RAW_j$;

an integration device integrating said weighted differential image data $\Delta RAW_j$ to generate adjusted image data RAW_En whose spatial frequency components are adjusted by said coefficients kj; and an addition device adding said adjusted image data RAW_En to said original image data RAW0 to generate output image data RAW_out that is finally output as said ultrasonotomographic image.

2. An ultrasonograph as claimed in claim 1, wherein said frequency component adjusting device divides the spatial frequency components of said original image data $RAW_0$ into low frequency components including direct current components and other alternating current components, and makes said adjustment on the alternating current components.

3. An ultrasonograph as claimed in claim 1, further comprising an operating unit that is manipulated to revise respective values of said coefficients kj.

4. An ultrasonograph as claimed in claim 3, wherein among said coefficients kj at least one represented by kN−1 has the smallest value and the values of said coefficients kj increases linear-functionally as the number j decreases, and wherein said operating unit is manipulated to change gradient of the linear-functional curve of said coefficients kj.

5. An ultrasonograph as claimed in claim 3, wherein among said coefficients kj one represented by kN−1 has the smallest value and said operating unit is manipulated to decide which of said coefficients kj has to have the largest value.

6. An ultrasonograph as claimed in claim 1, further comprising a revising device that revises the values of said coefficients kj, depending upon at least one of those data that represent a body part to observe, a frequency of said ultrasonic wave from said ultrasonic probe, and a display depth of said ultrasonotomographic image.

7. An ultrasonograph as claimed in claim 1, wherein said frequency component adjusting device further comprises a multiplication device for multiplying said adjusted image data RAW_En by a coefficient K ($0 \leq K \leq 1$) to decide a degree of influence of said adjustment of the spatial frequency components of said original image data $RAW_0$ on said output image data RAW_out.

8. An ultrasonograph as claimed in claim 7, further comprising an operating unit that is manipulated to revise said coefficient K.

9. An ultrasonograph as claimed in claim 7, further comprising a revising device that revises said coefficient K depending upon at least one of those data that represent a body part to observe, a frequency of said ultrasonic wave from said ultrasonic probe, and a display depth of said ultrasonotomographic image.

10. An ultrasonograph as claimed in claim 1, wherein said frequency component adjusting device divides the spatial frequency components of said original image data $RAW_0$ into low frequency components including direct current components and other alternating current components, and adjusts the low frequency components including the direct current components.

11. An ultrasonograph as claimed in claim 10, wherein said frequency component adjusting device holds down variations in luminance totally with respect to the low frequency components including the direct current components of the spatial frequency components.

12. An ultrasonograph as claimed in claim 1, wherein said frequency component adjusting device divides the spatial frequency components of said original image data $RAW_0$ into low frequency components including direct current components, and other alternating current components, and makes said adjustment on both the low frequency components including the direct current components and the alternating current components.

13. An ultrasonograph as claimed in claim 12, wherein said frequency component adjusting device holds down variations in luminance totally with respect to the low frequency components including the direct current components of the spatial frequency components.

14. An ultrasonograph as claimed in claim 1, wherein said frequency component adjusting device comprises:

an unsharp image data generating device for generating unsharp image data $RAW_i$ (i=1 to N, N=a positive integer) by reducing the spatial frequency components of said original image data $RAW_0$ in N steps;

a subtraction device subtracting said unsharp image data RAW; from one another $RAW_{i-1}$ to generate differential image data $\Delta RAW_j$ (j=0 to N−1);

a weighting device for weighting said differential image data $\Delta RAW_j$ by multiplying them by coefficients kj which are prepared for respective ones of said differential image data $\Delta RAW_j$;

an integration device integrating said weighted differential image data $\Delta RAW_j$ to generate adjusted image data RAW_En whose spatial frequency components are adjusted by said coefficients kj;

a device for generating biased image data $RAW_{mg}$ from said unsharp image data $RAW_i$ with reference to a biasing table that extracts data of designated luminance ranges from said unsharp image data $RAW_i$; and a generating device adding said adjusted image data RAW_En to said original image data $RAW_0$, and adding or subtracting said biased image data $RAW_{img}$ to generate said output image data RAW_out.

15. An ultrasonograph as claimed in claim 14, further comprising an operating unit that is manipulated to revise respective values of said coefficients kj.

16. An ultrasonograph as claimed in claim 15, wherein among said coefficients kj at least one represented by kN−1 has the smallest value and the values of said coefficients kj increases linear-functionally as the number j decreases, and wherein said operating unit is manipulated to change gradient of the linear-functional curve of said coefficients kj.

17. An ultrasonograph as claimed in claim 15, wherein among said coefficients kj one represented by kN−1 has the smallest value and said operating unit is manipulated to decide which of said coefficients kj has to have the largest value.

18. An ultrasonograph as claimed in claim 14, further comprising a revising device that revises the values of said coefficients kj depending upon at least one of those data that represent a body part to observe, a frequency of said ultrasonic wave from said ultrasonic probe, and a display depth of said ultrasonotomographic image.

19. An ultrasonograph as claimed in claim 14, wherein said frequency component adjusting device further comprises a multiplication device for multiplying said adjusted image data RAW_En by a coefficient Ka ($0 \leq Ka \leq 1$) to decide a degree of influence of said adjustment of the spatial frequency components of said original image data $RAW_0$ on said output image data RAW_out.

20. An ultrasonograph as claimed in claim 19, further comprising an operating unit that is manipulated to revise said coefficient Ka.

21. An ultrasonograph as claimed in claim 19, further comprising a revising device that revises said coefficient Ka depending upon at least one of those data that represent a body part to observe, a frequency of said ultrasonic wave from said ultrasonic probe, and a display depth of said ultrasonotomographic image.

22. An ultrasonograph as claimed in claim 14, wherein said biasing table is designed to generate output image data RAW_out to hold down a high luminance range and enhance a middle luminance range.

23. An ultrasonograph as claimed in claim 14, further comprising an operating unit for changing a volume of data reduction from said original image data $RAW_o$ to generate said unsharp image data $RAW_i$.

24. An ultrasonograph as claimed in claim 14, further comprising a revising device that revises a volume of data reduction from said original image data $RAW_o$ to generate said unsharp image data $RAW_i$, and/or said biasing table depending upon at least one of those data that represent a body part to observe, a frequency of said ultrasonic wave from said ultrasonic probe, and a display depth of said ultrasonotomographic image.

25. An ultrasonograph as claimed in claim 14, further comprising a multiplication device for multiplying said biased image data $RAW_{img}$ by a coefficient Kb ($0 \leq Kb \leq 1$) to decide a degree of influence of said adjustment of the spatial frequency components of said original image data $RAW_0$ on said output image data RAW_out.

26. An ultrasonograph as claimed in claim 25, further comprising an operating unit for revising said coefficient Kb.

27. An ultrasonograph as claimed in claim 25, further comprising a revising device that revises said coefficient Kb depending upon at least one of those data that represent a body part to observe, a frequency of said ultrasonic wave from said ultrasonic probe, and a display depth of said ultrasonotomographic image.

28. An ultrasonograph as claimed in claim 1, wherein said ultrasonic probe is an intra-cavity diagnostic ultrasonic probe that has an imaging device built therein for taking an optical image of an internal body part.

29. An ultrasonograph comprising:
an ultrasonic probe configured to scan a living body with ultrasonic wave and receives ultrasonic echo to output echo signals;
a device for generating original image data $RAW_0$ of an ultrasonotomographic image by digitalizing said echo signals;
a frequency component adjusting device for adjusting spatial frequency components of said original image data so as to avoid chroma clip in both highlight and shadow ranges of said ultrasonotomographic image; and
a displaying device for displaying said ultrasonotomographic image based on output image data from said frequency component adjusting device,
wherein said frequency component adjusting device comprises:
an unsharp image data generating device for generating unsharp image data $RAW_1$ by reducing the spatial frequency components of said original image data $RAW_0$;
a device for generating biased image data $RAW_{img}$ from said unsharp image data $RAW_1$ with reference to a biasing table that extracts data of designated luminance ranges from said unsharp image data $RAW_1$; and
a generating device adding said biased image data $RAW_{img}$ to said original image data RAW0 or subtracting said biased image data $RAW_{img}$ from said original image data RAW0 to generate said-output image data RAW_out that is finally output as said ultrasonotomographic image.

30. An ultrasonograph as claimed in claim 29, wherein said biasing table is designed to generate output image data RAW_out to hold down a high luminance range and enhance a middle luminance range.

31. An ultrasonograph as claimed in claim 29, further comprising an operating unit that is manipulated to revise a volume of data reduction from said original image data $RAW_o$ to generate said unsharp image data $RAW_1$.

32. An ultrasonograph as claimed in claim 29, further comprising a revising device that revises a volume of data reduction from said original image data $RAW_0$ to generate said unsharp image data $RAW_1$, and/or said biasing table, depending upon at least one of those data that represent a body part to observe, a frequency of said ultrasonic wave from said ultrasonic probe, and a display depth of said ultrasonotomographic image.

33. An ultrasonograph as claimed in claim 29, wherein said frequency component adjusting device further comprises a multiplication device for multiplying said biased image data $RAW_{img}$ by a coefficient K ($0 \leq K \leq 1$) to decide a degree of influence of said adjustment of the spatial frequency components of said original image data $RAW_0$ on said output image data RAW_out.

34. An ultrasonograph as claimed in claim 33, further comprising an operating unit that is manipulated to revise said coefficient K.

35. An ultrasonograph as claimed in claim 33, further comprising a revising device that revises said coefficient K depending upon at least one of those data that represent a body part to observe, a frequency of said ultrasonic wave from said ultrasonic probe, and a display depth of said ultrasonotomographic image.

36. A method of generating an ultrasonotomographic image comprising the steps of:
scanning a living body with ultrasonic wave to detect echo signals;
generating original image data of an ultrasonotomographic image of said living body by digitalizing said echo signals; and
adjusting spatial frequency components of said original image data so as to avoid chroma clip in both highlight and shadow ranges of said ultrasonotomographic image,
wherein said adjusting step comprises steps of:
generating unsharp image data $RAW_i$ (i=1 to N, N=a positive integer) by reducing the spatial frequency components of said original image data $RAW_0$ in N steps;
subtracting said unsharp image data RAW; from one another $RAW_{i-1}$ to generate differential image data $\Delta RAW_j$ (j=0 to N-1);
weighting said differential image data $\Delta RAW_j$ by multiplying them by coefficients kj which are prepared for respective ones of said differential image data $\Delta RAW_j$;
integrating said weighted differential image data $\Delta RAW_j$ to generate adjusted image data RAW_En whose spatial frequency components are adjusted by said coefficients kj; and
adding said adjusted image data RAW_En to said original image data $RAW_0$ to generate output image data RAW_out that is finally output as said ultrasonotomographic image.

37. A method as claimed in claim 36, wherein said adjusting step comprises steps of dividing the spatial frequency components of said original image data RAW0 into low frequency components including direct current components, and other alternating current components, and adjusting the alternating current components.

38. A method as claimed in claim 36, wherein respective values of said coefficients kj are revisable manually or automatically depending upon predetermined factors.

39. A method as claimed in claim 36, further comprising a step of
multiplying said adjusted image data RAW_En by a coefficient K ($0 \leq K \leq 1$) to decide a degree of influence of said adjustment of the spatial frequency components of said original image data $RAW_0$ on said output image data RAW_out.

40. A method as claimed in claim 36, wherein said adjusting step comprises steps of dividing the spatial frequency components of said original image data $RAW_0$ into low frequency components including direct current components, and other alternating current components, and adjusting the low frequency components including the direct current components.

41. A method as claimed in claim 40, wherein said adjusting step comprises steps of:
generating unsharp image data $RAW_1$ by reducing the spatial frequency components of said original image data $RAW_0$;
generating biased image data $RAW_{img}$ from said unsharp image data $RAW_1$ by extracting data of designated luminance ranges from said unsharp image data $RAW_1$ with reference to a biasing table; and
adding said biased image data $RAW_{img}$ to said original image data $RAW_0$ or subtracting said biased image data $RAW_{img}$ from said original image data $RAW_0$ to generate said output image data RAW_out that is finally output as said ultrasonotomographic image.

42. A method as claimed in claim 41, wherein output image data RAW_out to hold down a high luminance range and enhance a middle luminance range by said biasing table is generated.

43. A method as claimed in claim 41, further comprising a step of multiplying said biased image data $RAW_{img}$ by a coefficient K ($0 \leq K \leq 1$) to decide a degree of influence of said adjustment of the spatial frequency components of said original image data $RAW_0$ on said output image data RAW_out.

44. A method as claimed in claim 40, wherein said adjustment is to hold down variations in luminance totally with respect to the low frequency components including the direct current components of the spatial frequency components.

45. A method as claimed in claim 36, wherein said adjusting step comprises steps of dividing the spatial frequency components of said original image data $RAW_0$ into low frequency components including direct current components, and other alternating current components, and adjusting both the low frequency components including the direct current components and the alternating current components.

46. A method as claimed in claim 45, wherein said frequency component adjusting device holds down variations in luminance totally with respect to the low frequency components including the direct current components of the spatial frequency components.

47. A method of generating an ultrasonotomographic image comprising the steps of:
scanning a living body with ultrasonic wave to detect echo signals;
generating original image data of an ultrasonotomographic image of said living body by digitalizing said echo signals; and
adjusting spatial frequency components of said original image data so as to avoid chroma clip in both highlight and shadow ranges of said ultrasonotomographic image, wherein said adjusting step comprises steps of:
generating device for generating unsharp image data $RAW_i$ (i=1 to N, N=a positive integer) by reducing the spatial frequency components of said original image data $RAW_0$ in N steps;
a subtraction device subtracting said unsharp image data $RAW_i$ from one another $RAW_{i-1}$ to generate differential image data $\Delta RAW_j$ (j=0 to N−1);
weighting said differential image data $\Delta RAW_j$ by multiplying them by coefficients kj which are prepared for respective ones of said differential image data $\Delta RAW_j$;
integrating said weighted differential image data $\Delta RAW_j$ to generate adjusted image data RAW_En whose spatial frequency components are adjusted by said coefficients kj;
generating biased image data $RAW_{img}$ from said unsharp image data $RAW_i$ with reference to a biasing table that extracts data of designated luminance ranges from said unsharp image data $RAW_i$; and
adding said adjusted image data RAW_En to said original image data $RAW_0$, and adding or subtracting said biased image data $RAW_{img}$ to generate output image data RAW_out that is finally output as said ultrasonotomographic image.

48. A method as claimed in claim 47,
wherein output image data RAW_out to hold down a high luminance range and enhance a middle luminance range by said biasing table is generated.

49. A method as claimed in claim 47, further comprising a step of multiplying said adjusted image data RAW_En by a coefficient Ka ($0 \leq Ka \leq 1$) to decide a degree of influence of said adjustment of the alternating current components of the spatial frequency components of said original image data $RAW_0$.

50. A method as claimed in claim 47, further comprising a step of multiplying said biased image data $RAW_{img}$ by a coefficient Kb ($0 \leq Kb \leq 1$) to decide a degree of influence of said adjustment of the low frequency components including the direct current components of the spatial frequency components of said original image data $RAW_0$.

51. A non-transitory computer readable recording medium having embodied thereon an ultrasonotomographic image generator computer program for executing a method for generating an ultrasonotomographic image from echo signals received on an ultrasonic probe that scans a living body with ultrasonic wave, wherein said method comprises:
generating original image data $RAW_0$ of an ultrasonotomographic image of said living body by digitalizing said echo signals,
making adjustment on spatial frequency components of said original image data so as to avoid chroma clip in both highlight and shadow ranges of said ultrasonotomographic image;
generating unsharp image data $RAW_i$ (i=1 to N, N=a positive integer) by reducing the spatial frequency components of said original image data $RAW_0$ in N steps;
subtracting said unsharp image data $RAW_i$ from one another $RAW_{i-1}$ to generate differential image data $\Delta RAW_j$ (j=0 to N−1);
weighting said differential image data $\Delta RAW_j$ by multiplying them by coefficients kj which are prepared for respective ones of said differential image data $\Delta RAW_j$;

integrating said weighted differential image data $\Delta RAW_j$ to generate adjusted image data RAW_En whose spatial frequency components are adjusted by said coefficients kj; and adding said adjusted image data RAW_En to said original image data $RAW_0$ to generate output image data RAW_out that is finally output as said final ultrasonotomographic image.

52. An ultrasonotomographic image generator program as claimed in claim 51, wherein said program makes said computer divide the spatial frequency components of said original image data $RAW_0$ into low frequency components including direct current components, and other alternating current components, and carry out said adjustment on the alternating current components.

53. An ultrasonotomographic image generator program as claimed in claim 51, wherein said program makes said computer carry out a further step of multiplying said adjusted image data RAW_En by a coefficient K ($0 \leq K \leq 1$) to decide a degree of influence of said adjustment of the spatial frequency components of said original image data $RAW_0$ on said output image data RAW_out.

54. An ultrasonotomographic image generator program as claimed in claim 51, wherein said program makes said computer divide the spatial frequency components of said original image data $RAW_0$ into low frequency components including direct current components, and other alternating current components, and carry out said adjustment on the low frequency components including the direct current components.

55. An ultrasonotomographic image generator program as claimed in claim 54, wherein said program makes said computer carry out a step of holding down variations in luminance totally with respect to the low frequency components including the direct current components of the spatial frequency components.

56. An ultrasonotomographic image generator program as claimed in claim 51, wherein said program makes said computer divide the spatial frequency components of said original image data $RAW_0$ into low frequency components including direct current components, and other alternating current components, and carry out said adjustment on both the low frequency components including the direct current components and the alternating current components.

57. An ultrasonotomographic image generator program as claimed in claim 56, wherein said program makes said computer carry out steps of:

generating device for generating unsharp image data $RAW_i$ (i=1 to N, N=a positive integer) by reducing the spatial frequency components of said original image data $RAW_0$ in N steps;

a subtraction device subtracting said unsharp image data RAW; from one another RAWi-1 to generate differential image data $\Delta RAW_j$ (j=0 to N-1);

weighting said differential image data $\Delta RAW_j$ by multiplying them by coefficients kj which are prepared for respective ones of said differential image data $\Delta RAW_j$;

integrating said weighted differential image data $\Delta RAW_j$ to generate adjusted image data RAW_En whose spatial frequency components are adjusted by said coefficients kj;

generating biased image data $RAW_{img}$ from said unsharp image data $RAW_i$ by extracting data of designated luminance ranges from said unsharp image data $RAW_i$ with reference to a biasing table; and adding said adjusted image data RAW_En to said original image data $RAW_0$, and adding or subtracting said biased image data $RAW_{img}$ to generate output image data RAW_out that is finally output as said ultrasonotomographic image.

58. An ultrasonotomographic image generator program as claimed in claim 57, wherein said program makes said computer carry out a further step of multiplying said adjusted image data RAW_En by a coefficient Ka ($0 \leq Ka \leq 1$) to decide a degree of influence of said adjustment of the alternating current components of the spatial frequency components of said original image data $RAW_0$.

59. An ultrasonotomographic image generator program as claimed in claim 57, wherein said program makes said computer carry out a further step of multiplying said biased image data $RAW_{img}$ by a coefficient Kb ($0 \leq Kb \leq 1$) to decide a degree of influence of said adjustment of the low frequency components including the direct current components of the spatial frequency components of said original image data $RAW_0$.

60. An ultrasonotomographic image generator program as claimed in claim 56, wherein said program makes said computer carry out a step of holding down variations in luminance totally with respect to the low frequency components including the direct current components of the spatial frequency components.

61. A non-transitory computer readable recording medium having embodied thereon an ultrasonotomographic image generator computer program for executing a method for generating an ultrasonotomographic image from echo signals received on an ultrasonic probe that scans a living body with ultrasonic wave, wherein said method comprises:

generating original image data $RAW_0$ of an ultrasonotomographic image of said living body by digitalizing said echo signals;

making adjustment on spatial frequency components of said original image data so as to avoid chroma clip in both highlight and shadow ranges of said ultrasonotomographic image, generating unsharp image data $RAW_1$ by reducing the spatial frequency components of said original image data $RAW_0$;

generating biased image data $RAW_{img}$ from said unsharp image data $RAW_1$ with reference to a biasing table that extracts data of designated luminance ranges from said unsharp image data $RAW_1$; and adding said biased image data $RAW_{img}$ to said original image data $RAW_0$ or subtracting said biased image data $RAW_{img}$ from said original image data $RAW_0$ to generate output image data RAW_out that is finally output as said ultrasonotomographic image.

62. An ultrasonotomographic image generator program as claimed in claim 61, wherein said program makes said computer carry out a further step of multiplying said biased image data $RAW_{img}$ by a coefficient K ($0 \leq K \leq 1$) to decide a degree of influence of said adjustment of the spatial frequency components of said original image data $RAW_0$ on said output image data RAW_out.

* * * * *